United States Patent
Budic

(10) Patent No.: US 8,433,352 B2
(45) Date of Patent: Apr. 30, 2013

(54) WIRELESS TELECOMMUNICATION SYSTEM, ACCESS NODE AND METHOD FOR IMPROVING A SUCCESS RATE OF A CONNECTION SETUP FOR AN ACCESS TERMINAL

(75) Inventor: Miroslav Budic, Murphy, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 138 days.

(21) Appl. No.: 13/166,534

(22) Filed: Jun. 22, 2011

(65) Prior Publication Data

US 2012/0329500 A1    Dec. 27, 2012

(51) Int. Cl.
*H04B 7/00*    (2006.01)
(52) U.S. Cl.
USPC ......... 455/509; 455/450; 455/456.2; 455/510
(58) Field of Classification Search ............... 455/422.1, 455/450–456.2, 464, 509, 510; 370/395.41, 370/332; 375/E7.141
See application file for complete search history.

(56) References Cited

U.S. PATENT DOCUMENTS

| | | | | |
|---|---|---|---|---|
| 8,036,664 B2 * | 10/2011 | Khetawat et al. | ............. | 455/436 |
| 8,169,997 B2 * | 5/2012 | Machida | ....................... | 370/350 |
| 2005/0248410 A1 * | 11/2005 | Su | ................... | 331/16 |
| 2010/0020731 A1 * | 1/2010 | Bourdeaut et al. | ............ | 370/281 |
| 2011/0039538 A1 * | 2/2011 | Madhavan et al. | ......... | 455/422.1 |

* cited by examiner

*Primary Examiner* — Dominic E Rego

(57) ABSTRACT

An access node (e.g., BSC, RNC) and a method are described herein for implementing a traffic allocation technique and improving a success rate of a connection setup for an access terminal. In addition, a wireless telecommunication system is described herein which includes an access node (e.g., BSC, RNC), and one or more radio sites (e.g., BTSs), wherein an access terminal is located within a radio coverage area of one of the radio sites, and wherein the access node is configured to implement a traffic allocation technique and is further configured to improve a success rate of a connection setup for the access terminal.

22 Claims, 9 Drawing Sheets

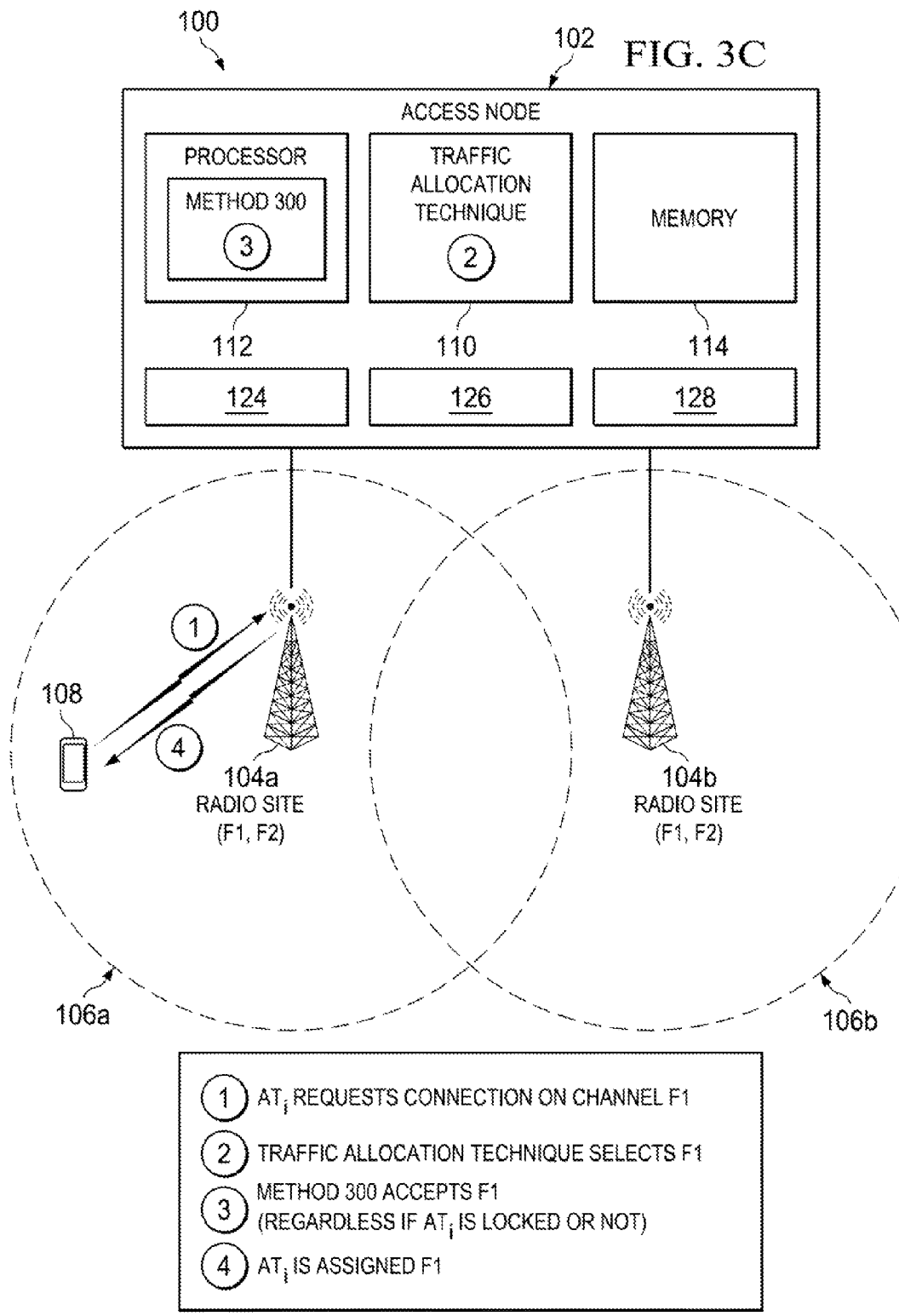

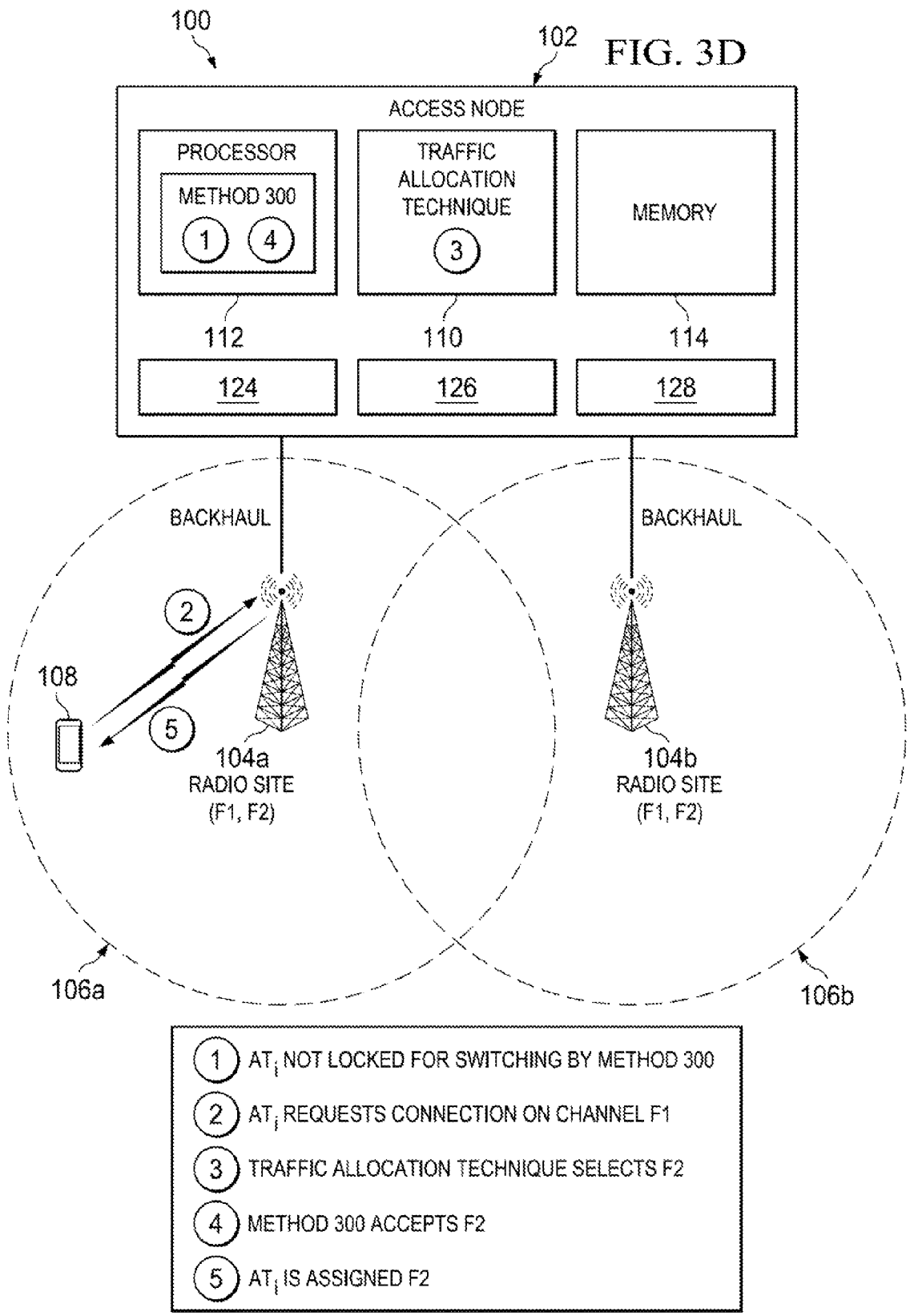

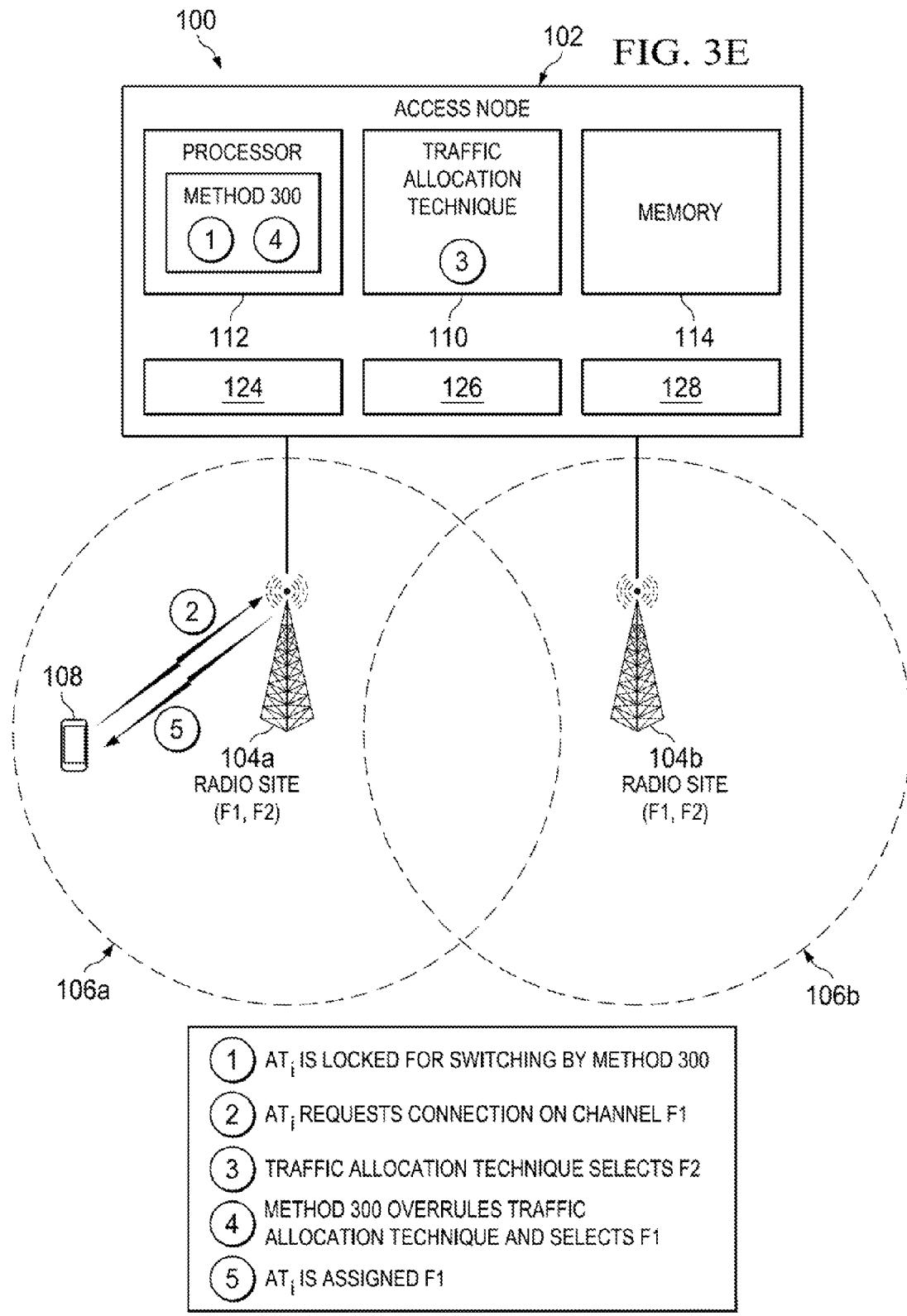

WIRELESS TELECOMMUNICATION SYSTEM, ACCESS NODE AND METHOD FOR IMPROVING A SUCCESS RATE OF A CONNECTION SETUP FOR AN ACCESS TERMINAL

TECHNICAL FIELD

The present invention relates to a wireless telecommunication system, an access node (e.g., BSC, RNC) and a method for improving a success rate of a connection setup for an access terminal.

BACKGROUND

The following abbreviations are herewith defined, at least some of which are referred to within the following description about at least the prior art and/or the present invention.
1× EV-DO 1× Evolved-Data Optimized
3GPP2 Third Generation Partnership Project 2
AN Access Network
AT Access Terminal
BSC Base Station Controller
BTS Base Transmitter Station
CDMA Code Division Multiple Access
MCTA Multi Carrier Traffic Allocation
RNC Radio Network Controller
THOLD Threshold A wireless telecommunication system (e.g., CDMA cellular radio system) has multiple access nodes (e.g., BSC, RNC) each of which manages multiple radio sites (e.g., BTSs). Each radio site has a certain set of frequencies F1, F2, F3 etc. . . . where access terminals (ATs) idling in that particular radio site will be distributed among those frequencies F1, F2, F3 etc. . . . In particular, the ATs when requesting a connection setup with the corresponding access node (e.g., BSC, RNC) will always request to use a particular frequency F1 (for example) known as an "originating frequency" on which they are idling. The corresponding access node (e.g., BSC, RNC) would always assign resources for the connection setup on the originating frequency (e.g., F1) which may cause an undesirable load imbalance among the frequencies F1, F2, F3 etc. . . . resulting in different levels of contention and user experiences. To address this particular drawback, the access node has been enhanced to implement a traffic allocation technique (e.g., Multi Carrier Traffic Allocation (MCTA) technique) which uniformly allocates the AT's traffic across the radio site's frequencies F1, F2, F3 etc. . . . (co-located frequencies) and even another radio site's frequencies F4, F5, F6 etc. . . . (non co-located frequencies).

In the traffic allocation technique, the AT can attempt to secure the air connection on one radio frequency (e.g., originating frequency) but be redirected to another collocated or non co-located radio frequency (e.g., target frequency) if the access node determines that the loading conditions warrant changing the AT from the originating frequency to the target frequency. The newly assigned target radio frequency can be in the same or different frequency band to that of the originating frequency. However, the radio characteristics of the new target frequency can be quite different from the originating frequency and hence the probability of a failed connection rises significantly with this type of cross-frequency traffic allocation. An exemplary list of some of the reasons why the probability of a failed connection can rise significantly when the access node's traffic allocation technique directs the AT to switch from the originating frequency (e.g., F1) to the target frequency (e.g., F2) are as follows:

Frequency selective fading could make radio conditions on the originating frequency and the assigned target frequency significantly different in any given location within the radio-site.

Interference characteristics from surrounding radio sites (cells) may vary between the originating frequency and the assigned target frequency due to different traffic/load levels.

Significant coverage differences can exist in the radio site between the originating frequency and the target frequency when the AT's traffic is re-directed across different frequency bands.

The radio site's equipment installations such as the feeder paths and antenna locations on the tower can be different for the originating frequency and target frequency and this difference can lead to further changes in coverage footprints even when the originating frequency and target frequency are collocated frequencies or in the same frequency band. For example, antennas that transmit down link signals to the AT may be different physical entities on the tower which would add spatial de-correlation to the list of differences in radio channel conditions.

In addition to the above drawbacks, in CDMA (3G.PP2) cellular radio systems there is no provision for the ATs to measure potential target frequencies prior to switching to the target frequency, when requesting a traffic channel during a connection origination. Hence, the AT when instructed to change from an originating frequency to a target frequency is essentially blind to the target frequency's radio conditions. Thus, it can be appreciated that the traffic allocations technique of re-directing an AT from the originating frequency is inherently prone to connections failures, which presents a difficult trade-off against the uniform traffic distribution benefit of the traffic allocations technique. Accordingly, there has been and still is a need to address the various shortcomings associated with the access node's traffic allocation technique redirecting the AT from an originating frequency to a target frequency. These needs and other needs are satisfied by the present invention.

SUMMARY

An access node, a method, and a wireless telecommunication system that address the shortcomings of the prior art are described in the independent claims of the present application. Advantageous embodiments of the access node, the method, and the wireless telecommunication system have been described in the dependent claims of the present application.

In one aspect, the present invention provides an access node configured to implement a traffic allocation technique and further configured to improve a success rate of a connection setup for an access terminal. The access node comprises a processor and a memory that stores processor-executable instructions therein where the processor interfaces with the memory and executes the processor-executable instructions to enable the following operations. Receive a connection setup request message initiated by the access terminal, where the connection setup request message includes a request from the access terminal to use an originating frequency. Determine if the access terminal is locked from changing from the originating frequency, where the access terminal would be locked if there was a predetermined number of previous connection setups which had previously failed when the access terminal was redirected by the traffic allocation technique from using a previously requested originating frequency to some other frequency. If the access terminal is locked, then set a connection for the access terminal on the originating frequency regardless if the traffic allocation technique had determined the access terminal should be redirected from the originating frequency to a target frequency, where the originating frequency is different than the target frequency. If the access terminal is not locked, then set a connection for the access terminal to either the originating frequency or the target frequency as determined by the traffic allocation technique. The access node has an advantage in that it reduces the failed connection setup rate for inter frequency traffic assignments to access terminals while maintaining the benefits of traffic load balancing across the available frequencies.

In yet another aspect, the present invention provides a method implemented by an access node for improving a success rate of a connection setup for an access terminal, where the access node is also configured to implement a traffic allocation technique. The method comprising the steps of: (a) receiving a connection setup request message initiated by the access terminal, where the connection setup request message includes a request from the access terminal to use an originating frequency; (b) determining if the access terminal is locked from changing from the originating frequency, where the access terminal would be locked if there was a predetermined number of previous connection setups which had previously failed when the access terminal was redirected by the traffic allocation technique from using a previously requested originating frequency to some other frequency; and (c) if the access terminal is locked, then setting a connection for the access terminal on the originating frequency regardless if the traffic allocation technique had determined the access terminal should be redirected from the originating frequency to a target frequency, where the originating frequency is different than the target frequency; otherwise (d) if the access terminal is not locked, then setting a connection for the access terminal to either the originating frequency or the target frequency as determined by the traffic allocation technique. The method has an advantage in that it reduces the failed connection setup rate for inter frequency traffic assignments to access terminals while maintaining the benefits of traffic load balancing across the available frequencies.

In still yet another aspect, the present invention provides a wireless telecommunication system which comprises an access node and one or more radio sites, where an access terminal is located within a radio coverage area of one of the radio sites. The access node comprises a processor and a memory that stores processor-executable instructions therein where the processor interfaces with the memory and executes the processor-executable instructions to enable the following operations. Receive a connection setup request message initiated by the access terminal, where the connection setup request message includes a request from the access terminal to use an originating frequency. Determine if the access terminal is locked from changing from the originating frequency, where the access terminal would be locked if there was a predetermined number of previous connection setups which had previously failed when the access terminal was redirected by the traffic allocation technique from using a previously requested originating frequency to some other frequency. If the access terminal is locked, then set a connection for the access terminal on the originating frequency regardless if the traffic allocation technique had determined the access terminal should be redirected from the originating frequency to a target frequency, where the originating frequency is different than the target frequency. If the access terminal is not locked, then set a connection for the access terminal to either the originating frequency or the target frequency as determined by the traffic allocation technique. The wireless telecommunication system has an advantage in that it reduces the failed connection setup rate for inter frequency traffic assignments to access terminals while maintaining the benefits of traffic load balancing across the available frequencies.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIGS. 3C-3E are several block diagrams used to explain several exemplary use cases on how the enhanced access node by implementing the method shown in FIGS. 3A-3B can improve a success rate of a connection setup for an access terminal in accordance the present invention.

DETAILED DESCRIPTION

Figure 1:
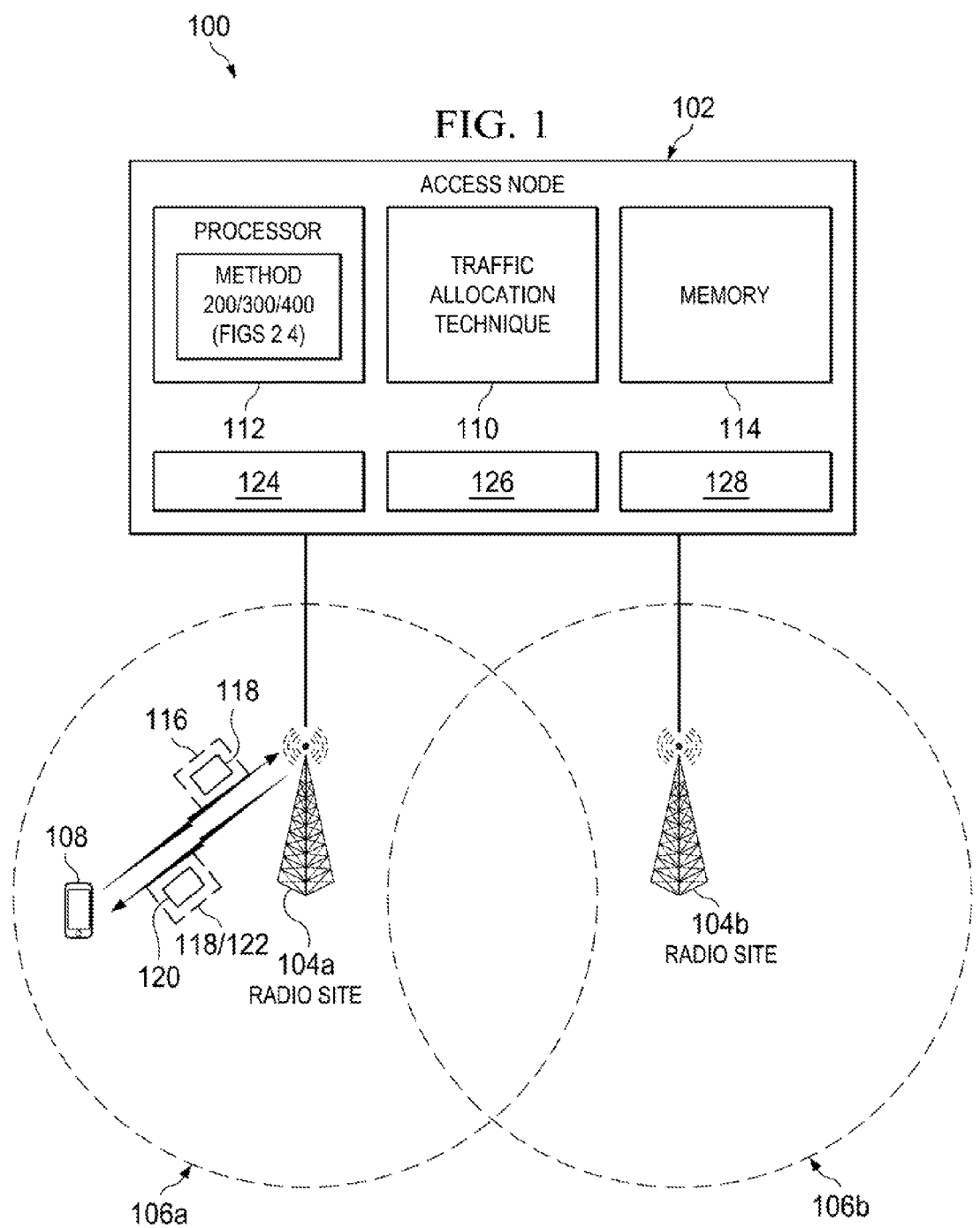
FIG. 1 is a block diagram of an exemplary wireless telecommunication system which has an enhanced access node configured in accordance with an embodiment of the present invention.

Referring to FIG. 1, there is a block diagram of an exemplary wireless telecommunication system 100 which has an enhanced access node 102 configured in accordance with an embodiment of the present invention. The exemplary wireless telecommunication system 100 (e.g., CDMA cellular radio system 100) includes one or more enhanced access nodes 102 (e.g., BSC 102, RNC 102) (one shown). Each enhanced access node 102 manages one or more radio sites 104a and 104b (e.g., BTSs 104a and 104b) (two shown). Each radio site 104a and 104b has a corresponding radio coverage area 106a and 106b. Each radio coverage area 106a and 106b supports a certain set of frequencies F1, F2, F3 etc. . . . An access terminal 108 (e.g., mobile device 108, user equipment 108, smart phone 108) (one shown) is located within the radio coverage area 106a. The skilled person will appreciate that the exemplary wireless telecommunication system 100 can support many access terminals 108 and includes many other components which are well known in the art but for clarity are not described herein while the enhanced access node 102 which is relevant to the present invention is described in detail herein. In particular, a detailed description is provided next to explain how the enhanced access node 102 which is configured to implement a traffic allocation technique 110 can be further configured to improve a success rate of a connection setup for the access terminal 108. The access node 102 also has many well known components incorporated therein but for clarity those well known components are not described herein.

Figure 2:
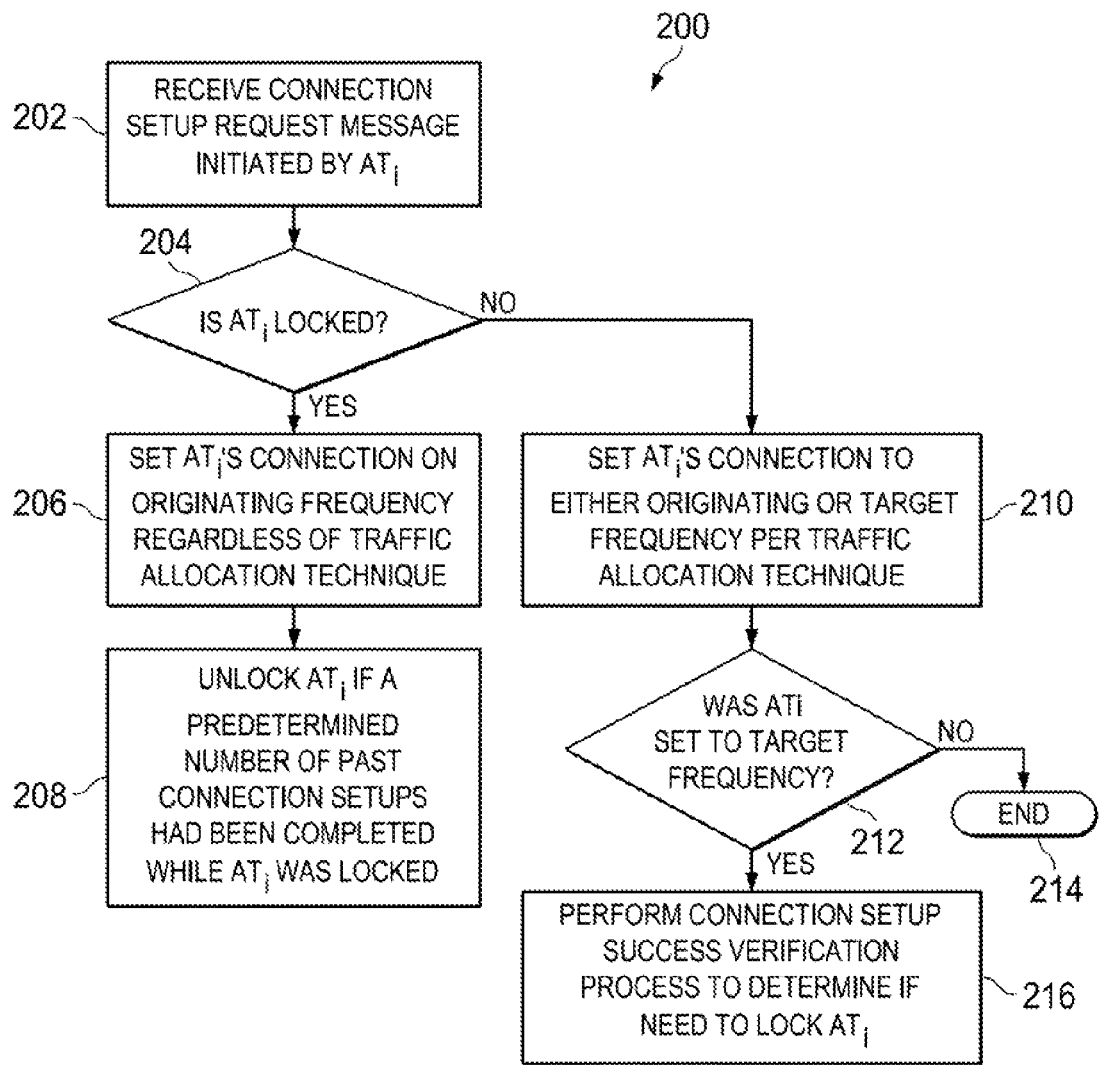
FIG. 2 is a flowchart illustrating the basic steps of a method implemented by the enhanced access node for improving a success rate of a connection setup for an access terminal in accordance with an embodiment of the present invention.

The access node 102 is configured to implement the traffic allocation technique 110 (e.g., Multi Carrier Traffic Allocation (MCTA) technique 110) and further configured to implement a method 200 to improve a success rate of a connection setup for the access terminal 108. The access node 102 includes a processor 112 (central processing unit 112) and a memory 114 (storage medium 114) which stores processor-executable instructions therein where the processor 112 interfaces with the memory 114 and executes the processor-executable instructions to implement the steps of method 200 shown in FIG. 2. In step 202, the access node 102 receives a connection setup request message 116 initiated by the access terminal 108 (AT$_i$). The connection setup request message 116 includes a request from the access terminal 108 to use an originating frequency 118 (e.g., F1). At step 204, the access node 102 determines if the access terminal 108 is locked such that it is prohibited from changing from the originating frequency 118 (e.g., F1). The access terminal 108 would be locked if there was a predetermined number of previous connection setups which had previously failed when the access terminal 108 was redirected by the traffic allocation technique 110 from a previously requested originating frequency to some other frequency.

If the access terminal 108 is locked in step 204, then the access node 102 at step 206 sets a connection for the access terminal 108 on the originating frequency 118 (e.g., F1) regardless if the traffic allocation technique 110 had determined the access terminal 108 should be redirected from the originating frequency 118 (e.g., F1) to a target frequency 120 (e.g. F2). The target frequency 120 (e.g., F2) can be any frequency that is different than the originating frequency 118 (e.g., F1). At this point, the access node 102 would send a traffic channel assignment message 122 to the access terminal 108 with the indication that the access terminal 108 is to use the originating frequency 118 (e.g., F1) (see FIG. 1). After step 206, the access node 102 at step 208 would unlock the access terminal 108 if a predetermined number of past connection setups had been successfully completed while the access terminal 108 was locked and prohibited from changing from the previously requested originating frequency (e.g., see steps 312, 314 and 316 in FIG. 3A and steps 408, 410, and 414 in FIG. 4A).

If the access terminal 108 is not locked in step 204, then the access node 102 at step 210 sets a connection for the access terminal 108 to either the originating frequency 118 (e.g., F1) or the target frequency 120 (e.g., F2) as determined by the traffic allocation technique 110. Assuming the traffic allocation technique 110 selected the target frequency 120 (e.g., F2), then the access node 102 would send a traffic channel assignment message 122 to the access terminal 108 with the indication that the access terminal 108 is to use the target frequency 120 (e.g., F2) (see FIG. 1). After step 210, the access node 102 at step 212 determines if the access terminal 108 was redirected by the traffic allocation technique 110 and set to the target frequency 120 (e.g., F2). If no, then the access node 102 at step 214 ends method 200. If yes, then the access node 102 at step 216 performs a connection setup success verification process to determine if there is a need to lock the access terminal 108 so that in a future connection setup this access terminal 108 would be prohibited from being redirected from a future originating frequency to a future target frequency (e.g., see steps 322, 324, 326, 328, 330, 332, and 334 in FIG. 3B and steps 422, 424, 426, 428, 430, 432, and 434 in FIG. 4B).

Figure 3A:
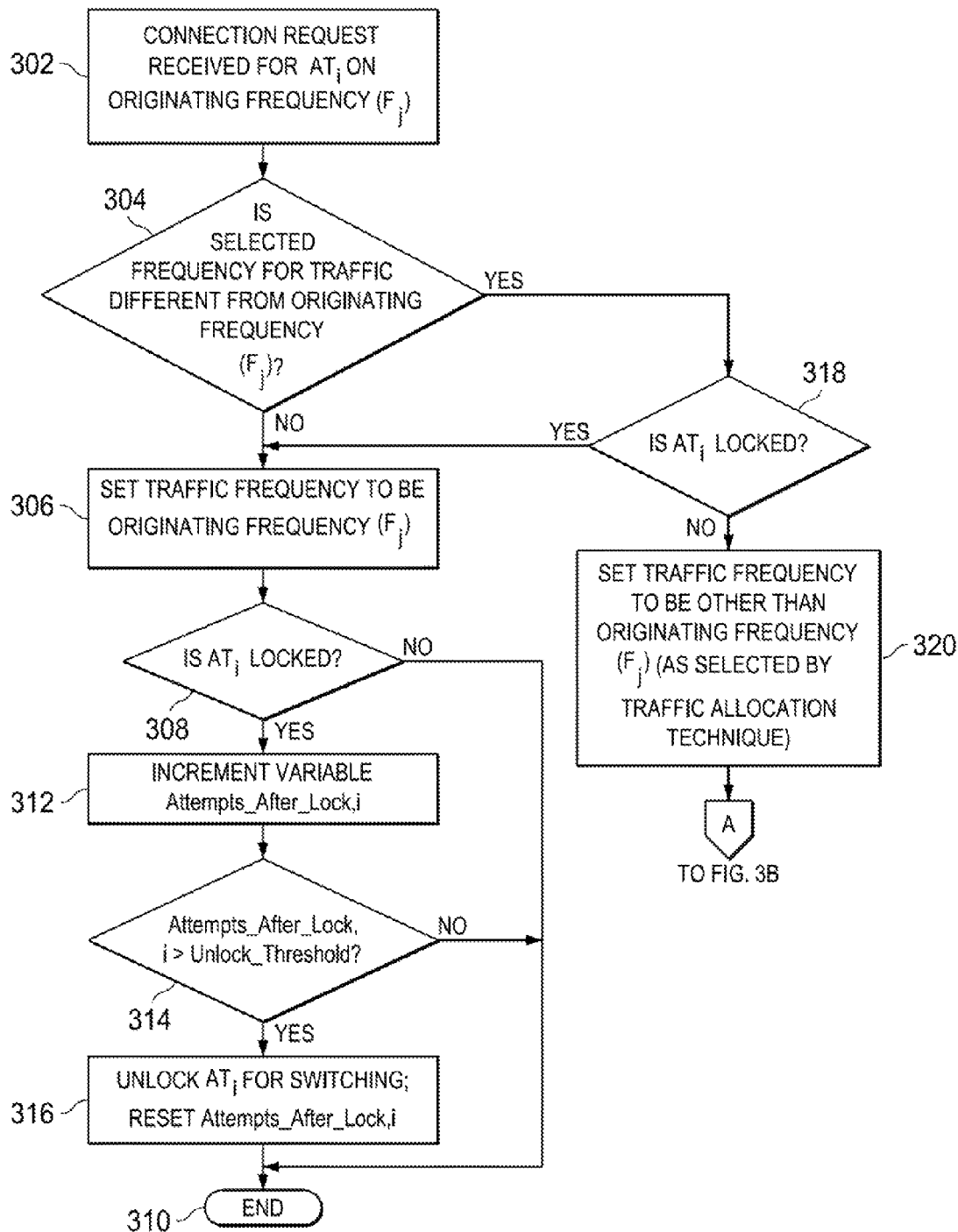
FIGS. 3A-3B is a flowchart illustrating the basic steps of a method implemented by the enhanced access node for improving a success rate of a connection setup for an access terminal in accordance with another embodiment of the present invention.
Figure 3B:
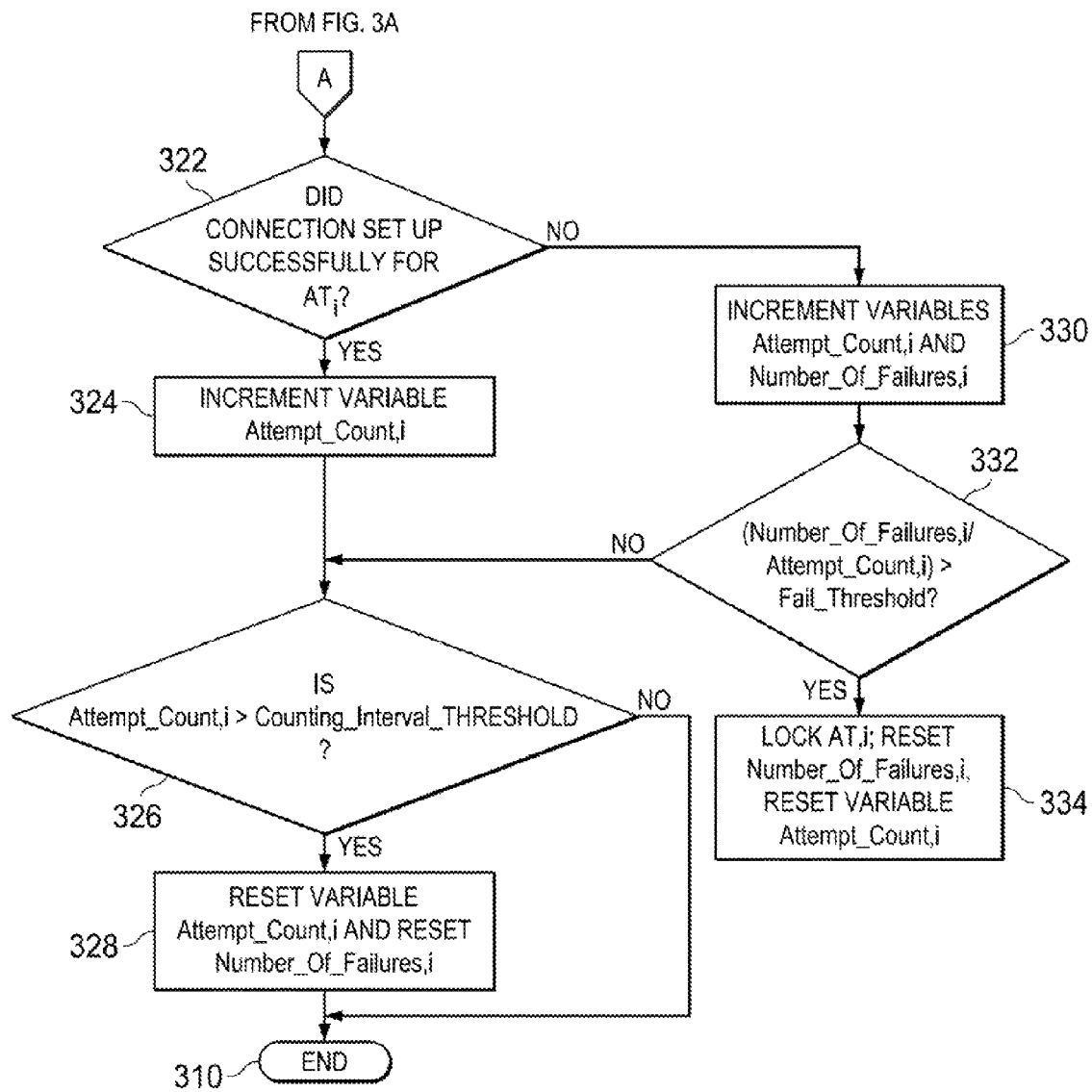
Figure 4A:
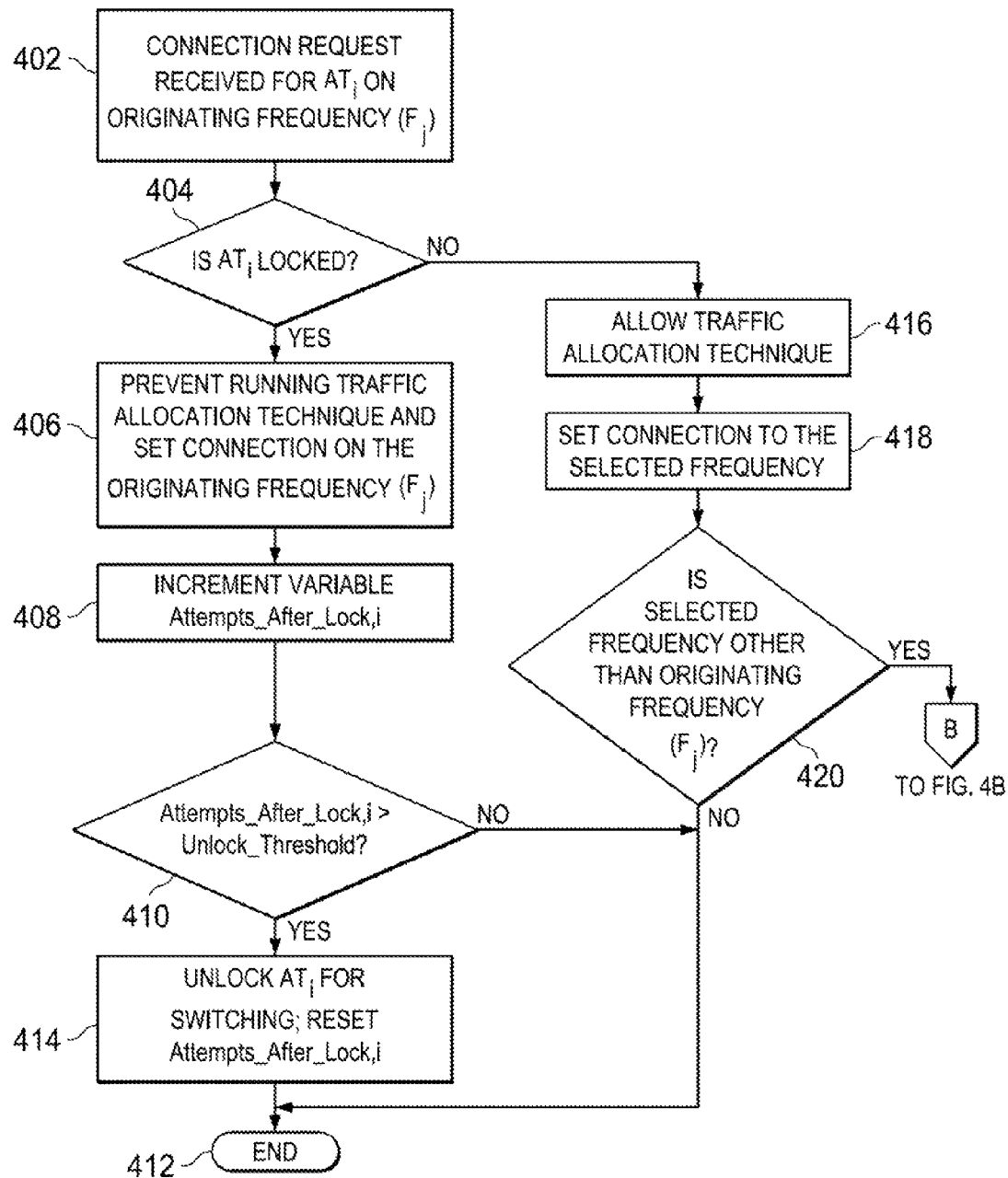
FIGS. 4A-4B is a flowchart illustrating the basic steps of a method implemented by the enhanced access node for improving a success rate of a connection setup for an access terminal in accordance with yet another embodiment of the present invention.
Figure 4B:
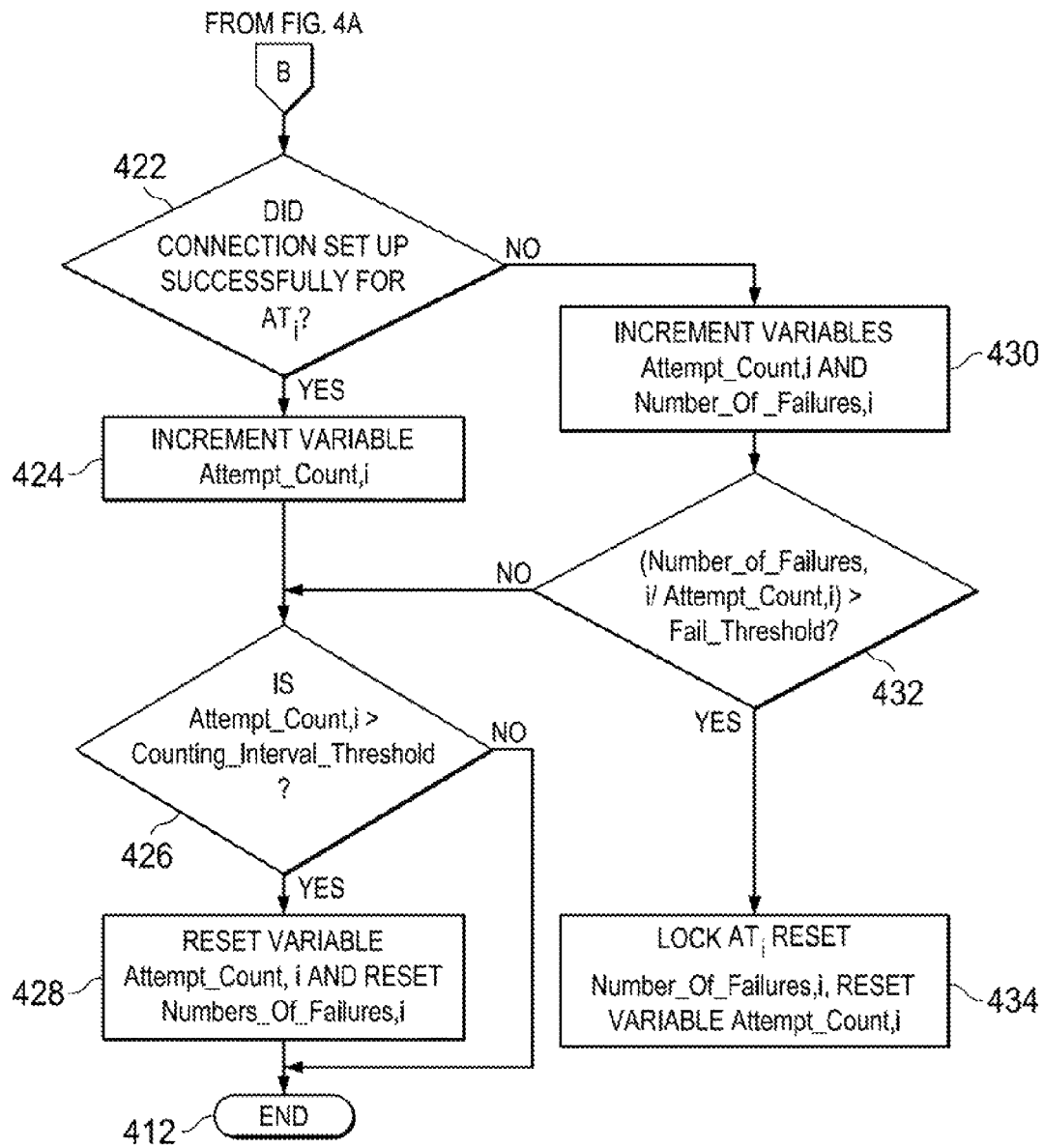

There are several ways that the access node 102 can be configured to implement method 200 where two exemplary ways are discussed in detail below with respect to FIGS. 3A-3B and 4A-4B. For instance, the method 300 shown in FIGS. 3A-3B is where the access node 102 would implement the traffic allocation technique 110 before determining whether or not the access terminal 108 is locked from changing from the originating frequency 118 (e.g., F1). In contrast, the method 400 shown in FIGS. 4A-4B is where the access node would implement the traffic allocation technique 110 only after determining that the access terminal 108 is not locked from changing from the originating frequency 118. Plus, in method 400 if the access node 102 determines that the access terminal 108 is locked then the access node 102 would prevent the implementation of the traffic allocation technique 110.

Referring to FIGS. 3A-3B, there is a flowchart illustrating the basic steps of method 300 implemented by the enhanced access node 102 for improving a success rate of a connection setup for the access terminal 108 in accordance with another embodiment of the present invention. In step 302, the access node 102 receives a connection setup request message 116 initiated by the access terminal 108. The connection setup request message 116 includes a request from the access terminal 108 (AT$_i$) to use an originating frequency 118 (e.g., F$_j$).

At step 304, the access node 102 after the implementation of the traffic allocation technique 110 (e.g., MCTA technique 110) determines if the selected frequency for the traffic of the access terminal 108 is different from the originating frequency 118 (e.g., Fj). In other words, the access node 102 determines whether or not the traffic allocation technique 110 indicated that the access terminal 110 should be redirected from the originating frequency 118 (e.g., Fj) to some target frequency 120. The target frequency 120 can be any frequency that is different than the originating frequency 118 (e.g., Fj).

If the result of step 304 is no, then the access node 102 at step 306 sets the traffic frequency for the access terminal 108 to the originating frequency 118 (e.g., Fj). At step 308, the access node 102 determines if the access terminal 108 is locked or prohibited from being redirected from the originating frequency 118. If the result of step 308 is no, then the access node 102 at step 310 ends the method 300. If the result of step 308 is yes, then the access node 102 at step 312 increments a variable attempts_after_lock counter 124 associated with the access terminal 108. At step 314, the access node 102 determines if the variable attempts_after_lock counter 124 exceeds an unlock_threshold value. If the result of step 314 is no, then the access node 102 goes to step 310 and ends the method 300. If the result of step 314 is yes, then the access node 102 at step 316 unlocks the access terminal 108 such that upon receiving a future connection setup request message the access terminal 108 can be changed from using an originating frequency. In addition, the access node 102 at step 316 resets the variable attempts_after_lock counter 124 to an initial value. It should be noted that the access node 102 would maintain a separate variable attempts_after_lock counter 124 for each access terminal 108.

If the result of step 304 is yes, then the access node 102 at step 318 determines if the access terminal 108 is locked or prohibited from being redirected from the originating frequency 118. If result of step 318 is yes, then the access node 102 at proceeds to step 306. If result of step 318 is no, then the access node 102 at step 320 sets the traffic frequency for the access terminal 108 to the target frequency 120 which was selected by the traffic allocation technique 110. At step 322, the access node 102 determines or checks if the connection that was setup on the target frequency 120 for the access terminal 108 was successful.

If the result of step 322 is yes, then the access node 102 at step 324 increments a variable attempt_count counter 126 associated with the access terminal 108. Then at step 326, the access node 102 determines if the variable attempt_count counter 126 exceeds an counting_interval_threshold value. If the result of step 326 is no, then the access node 102 at step 310 ends the method 300. If the result of step 326 is yes, then the access node 102 at step 328 resets the variables attempt_count counter 126 and a number_of_failures counter 128 associated with the access terminal 108 to their respective initial values and then ends the method 300 at step 310.

If the result of step 322 is no, then the access node 102 at step 330 increments the variable attempt_count counter 126 and the variable number_of_failures counter 128 associated with the access terminal 108. At step 332, the access node 102 determines if a ratio of the values of the variable number_of_failures counter 124/the variable attempt_count counter 124 exceeds a failed_threshold value. If result of step 332 is no, then the access'node 102 proceeds to step 326. If the result of step 332 is yes, then the access node 102 at step 334 locks the access terminal 108 and resets the variable attempt_count counter 124 and the variable number_of_failures counter 128 associated with the access terminal 108 to their respective initial values.

In view of the foregoing, it can be seen that method 300 gets engaged if: (1) the traffic allocation technique 110 decides to switch the frequency to which a traffic channel is assigned to the access terminal 108 (step 304); or (2) the traffic allocation technique 110 decides not to switch frequency but the access terminal 108 is barred (or locked) from switching the originating frequency 118 (step 308). If the traffic allocation technique 110 does not decide to switch the originating frequency, then method 300 looks if the access terminal 108 is barred from switching and if it is increments the variable attempts_after_lock counter 124 (see steps 308 and 312). If the access terminal 108 gets barred from switching, then it can get unlocked and back into the switch-testing contention pool, after a certain number of non-switched connection attempts (i.e. to prevent permanent barring from switching) (see steps 314 and 316). If the access terminal 108 is not barred from switching at step 308 then method 300 takes no further action (see steps 308 and 310). The main idea here is that no action other than steps 308, 312, 314, and 316 is needed by method 300 if the traffic allocation technique 110 selects the same frequency that the access terminal 108 originated on. Basically, it is desirable to keep the traffic channel on the same carrier as the originating frequency 118 if the load conditions do not demand a frequency switch.

In the case, the traffic allocation technique 110 does decide to switch the frequency of the access terminal 108, then the method 300 looks to see if the access terminal 108 is barred from switching frequencies (step 318). If the access terminal 108 is barred, then frequency switching is prevented and the traffic channel is set on the originating frequency 118 (step 306) and the variable attempts_after_counter 124 is incremented (step 312). The main idea behind step 312 this is that when the certain access terminal 108 is barred from frequency switching it will not stay in that state indefinitely. To accomplish, the method 300 after a certain number of successful non-switched attempts, defined by the unlock_threshold value, unlocks the access terminal 108 so it becomes eligible for frequency switching again (steps 312, 314, and 316). If the access terminal 108 is not barred at step 308, then the method 300 allows the traffic allocation technique 110 to proceed with the connection setup on the selected (targeted) frequency 120 which is other than the originating frequency 118 (step 320). This means that the access terminal 108 has a good past history of successful traffic channel set-ups when the frequency is switched from the previously requested originating frequency 120.

In the case, when the connection setup for the access terminal 108 was successful when the frequency was switched (step 322) then the variable attempt_count counter 126 is incremented (step 324). Otherwise, the method 300 increments both the variable attempt_count_counter 126 and the variable number_of_failures counter 128 (step 330). Then, the method 300 checks if the ratio of the number_of_failures/the attempt counter is greater than a fail_threshold value (where the fail_threshold value is system configurable) and if so locks the access terminal 108 (i.e. it becomes barred from switching frequencies) and resets the attempt_count counter 126 and the variable number_of_failures counter 128 to initial value (e.g., 0) (steps 332 and 334). The basic idea behind the variable attempt_count counter 126 and the variable number_of_failures counter 128 is to have a process for locking the access terminal 108 if there are a certain number of unsuccessful connection setups when the access terminal 108 was redirected from the originating frequency 118. For example, the method 300 prefers to switch only access terminals that have a success rate greater than a target defined by (1-number_of_failures,i/attempt_count,i). The operator can set these variables and the thresholds.

The method 300 also checks after every successful switched connection set-up if the variable attempt_count counter 126 is greater than a counting_interval (where the counting_interval is system configurable) and if so resets the variable attempt_count counter 126 (see steps 326 and 328). The basic idea for the counting_interval check is to have a way of re-setting the success metric counting, so it does not continue indefinitely. For example, without this counting_interval check the access terminal 108 can have hundreds of successful cross-carrier set-ups (step 322) and no failures but then the access terminal 108 changes location and starts failing and without the counting interval check it would take time for ratio number_of_failures/attempt_count to build up (step 330) causing transient consecutive failures. Basically, the method 300 can be implemented on top of an existing traffic allocation scheme 110 and provide ways of switching frequency (at origination of connection) only to access terminals 108 that show a history of successful to switching.

There are several exemplary use case nos. 1-3 described next to help further explain some of the capabilities, features and benefits which are associated with the aforementioned method 300. Each use case no. 1, 2, and 3 is illustrated and described by using the same exemplary wireless telecommunication system 100 as shown in FIG. 1 but with step indicators added thereto to correspond with the basic steps of the respective use case.

Use Case No 1 (FIG. 3C):
1. Access terminal 108 ($AT_i$) requests connection on channel F1.
2. Traffic allocation technique 110 (e.g., MCTA 110) selects F1.
3. Method 300 accepts F1 (regardless if $AT_i$ is locked or not).
4. Access terminal 108 ($AT_i$) is assigned a connection setup on F1.

Use Case No 2 (FIG. 3D):
1. Access terminal 108 (AT$_i$) is not locked for switching by method 300.
2. Access terminal 108 (AT$_i$) requests connection on channel F1.
3. Traffic allocation technique 110 (e.g., MCTA 110) selects F2.
4. Method 300 accepts F2.
5. Access terminal 108 (AT$_i$) is assigned a connection setup on F2.

Use Case No 3 (FIG. 3E):
1. Access terminal 108 (AT$_i$) is locked for switching by method 300.
2. Access terminal 108 (AT$_i$) requests connection on channel F1.
3. Traffic allocation technique 110 (e.g., MCTA 110) selects F2.
4. Method 300 overrules traffic allocation technique 110 (e.g., MCTA 110) and selects F1.
5. Access terminal 108 (AT$_i$) is assigned a connection setup on F1.

Referring to FIGS. 4A-4B, there is a flowchart illustrating the basic steps of method 400 implemented by the enhanced access node 102 for improving a success rate of a connection setup for the access terminal 108 in accordance with yet another embodiment of the present invention. In step 402, the access node 102 receives a connection setup request message 116 initiated by the access terminal 108. The connection setup request message 116 includes a request from the access terminal 108 (AT$_i$) to use an originating frequency 118 (e.g., F$_j$).

At step 404, the access node 102 determines if the access terminal 108 is locked or prohibited from being redirected from the originating frequency 118. If the result of step 404 is yes, then the access node 102 at step 406 prevents the running of the traffic allocation technique 110 (e.g., MCTA technique 110) and sets the connection for the access terminal 108 on the originating frequency 118. Then, the access node 102 at step 408 increments a variable attempts_after_lock counter 124 associated with the access terminal 108. At step 410, the access node 102 determines if the variable attempts_after_lock counter 124 exceeds an unlock_threshold value. If the result of step 410 is no, then the access node 102 proceeds to step 412 and ends the method 400. If the result of step 420 is yes, then the access node 102 at step 414 unlocks the access terminal 108 such that upon receiving a future connection setup request message the access terminal 108 can be changed from using an originating frequency. In addition, the access node 102 at step 414 resets the variable attempts_after_lock counter 124 to an initial value. It should be noted that the access node 102 would maintain a separate variable attempts_after_lock counter 124 for each access terminal 108.

If the result of step 404 is no, then the access node 102 at step 416 allows the operation of the traffic allocation technique 110 (e.g., MCTA technique 110). At step 418, the access node 102 sets the connection for the access terminal 108 to the traffic allocation technique's selected frequency. Then, the access node 102 at step 420 determines if the traffic allocation technique's selected frequency is different than the originating frequency 118. If the result of step 420 is no, then the access node 102 proceeds to step 412 and ends the method 400. If the result of step 420 is yes, then the access node 102 at step 422 determines or checks if the connection that was set on the target frequency 120 for the access terminal 108 was successful.

If the result of step 422 is yes, then the access node 102 at step 424 increments a variable attempt_count counter 126 associated with the access terminal 108. Then at step 426, the access node 102 determines if the variable attempt_count counter 126 exceeds a counting_interval_threshold value. If the result of step 426 is no, then the access node 102 at step 412 ends the method 400. If the result of step 426 is yes, then the access node 102 at step 428 resets the variables attempt_count counter 126 and a number_of_failures counter 128 associated with the access terminal 108 to an initial value and then ends the method 400 at step 412.

If the result of step 422 is no, then the access node 102 at step 430 increments the variable attempt_count counter 126 and the variable number_of_failures counter 128 associated with the access terminal 108. At step 432, the access node 102 determines if a ratio of the values of the variable number_of_failures counter 128/the variable attempt_count counter 124 exceeds a failed_threshold value. If result of step 432 is no, then the access node 102 proceeds to step 426. If the result of step 432 is yes, then the access node 102 at step 434 locks the access terminal 108 and resets the variable attempt_count counter 126 and the variable number_of_failures counter 128 associated with the access terminal 108 to the initial value.

From the foregoing, one skilled in the art will appreciate that method 200, 300 and 400 is implemented on the access node 102 and works in conjunction with the traffic allocation technique 110 by checking past history of inter frequency success (redirected frequency success) for each individual access terminal 108. The method 200, 300 and 400 can be implemented on CDMA wireless telecommunication system 100 (e.g., 1× EV-DO wireless telecommunication system 100) but can also be applied on other types of wireless telecommunication systems. One skilled in the art will readily appreciate that the term "frequency" used herein can also be replaced by the terms "carrier" and "channel", as these terms are often used interchangeably within CDMA wireless access technologies. The method 200, 300, and 400 has many advantages several of which are as follows:

1) The method 200, 300 and 400 improves the failed connection rate for inter frequency traffic assignments, while maintaining the benefits of traffic load balancing across available frequencies.

2) The method 200, 300 and 400 allows more aggressive switching decisions providing further traffic balancing benefits relative to existing implementations.

3) The method 200, 300 and 400 can be orthogonal or in conjunctions with the existing traffic allocation technique 110 (e.g., MCTA technique 1000.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. An access node configured to implement a traffic allocation technique and further configured to improve a success rate of a connection setup for an access terminal, the access node comprising:
   a processor; and
   a memory that stores processor-executable instructions therein where the processor interfaces with the memory and executes the processor-executable instructions to enable the following:

receive a connection setup request message initiated by the access terminal, where the connection setup request message includes a request from the access terminal to use an originating frequency;

determine if the access terminal is locked from changing from the originating frequency, where the access terminal would be locked if there was a predetermined number of previous connection setups which had previously failed when the access terminal was redirected by the traffic allocation technique from a previously requested originating frequency to some other frequency; and if the access terminal is locked, then set a connection for the access terminal on the originating frequency regardless if the traffic allocation technique had determined the access terminal should be redirected from the originating frequency to a target frequency, where the originating frequency is different than the target frequency; otherwise if the access terminal is not locked, then set a connection for the access terminal to either the originating frequency or the target frequency as determined by the traffic allocation technique.

2. The access node of claim 1, wherein the traffic allocation technique is implemented before the processor determines whether or not the access terminal is locked from changing from the originating frequency.

3. The access node of claim 1, wherein the traffic allocation technique is implemented after the processor determines that the access terminal is not locked from changing from the originating frequency, and if the access terminal is locked then the processor prevents the implementation of the traffic allocation technique.

4. The access node of claim 1, wherein when the processor determines that the access terminal is locked then the processor further executes the processor-executable instructions stored in the memory to unlock the access terminal after a predetermined number of past connection setups had been successfully completed during which the access terminal was locked.

5. The access node of claim 1, wherein when the processor determines that the access terminal is locked then the processor further executes the processor-executable instructions stored in the memory to further enable the following:
increment a variable attempts_after_lock counter for the access terminal;
determine if the variable attempts_after_lock counter for the access terminal exceeds an unlock_threshold value;
if no, then end;
if yes, then unlock the access terminal such that upon receiving a future connection setup request message the access terminal can change from an originating frequency, and reset the variable attempts_after_lock counter for the access terminal to an initial value.

6. The access node of claim 1, wherein when the processor determines that the access terminal is not locked and the connection for the access terminal was set to be on the target frequency as determined by the traffic allocation technique then the processor further executes the processor-executable instructions stored in the memory to perform a connection setup success verification process to determine if need to lock the access terminal.

7. The access node of claim 1, wherein when the processor determines that the access terminal is not locked and the connection for the access terminal was set to be on the target frequency as determined by the traffic allocation technique then the processor further executes the processor-executable instructions stored in the memory to further enable following:
determine if the connection that was set on the target frequency for the access terminal was successful;
if yes, then increment a variable attempt_count counter for the access terminal and determine if the variable attempt_count counter for the access terminal exceeds an counting_interval_threshold value and if not then end and if yes then reset the variables attempt_count and number_of_failures counters for the access terminal to an initial value and then end;
if no, then increment the variable attempt_count counter for the access terminal and increment a variable number_of_failures counter for the access terminal and then determine if a ratio of values of the variable number_of_failures counter/the variable attempt_count counter exceeds a failed_threshold value and if no then determine if the variable attempt_count counter for the access terminal exceeds the counting_interval_threshold value and if not then end and if yes then reset the variable attempt_count counter and the variable number_of_failures counter for the access terminal to their initial values and then end, and if the ratio of values of the variable number_of_failures counter/the variable attempt_count counter was determined to exceed the failed_threshold value then lock the access terminal and reset the variable number_of_failures counter for the access terminal to an initial value and reset the variable attempt_count counter for the access terminal to the initial value and then end.

8. A method implemented by an access node for improving a success rate of a connection setup for an access terminal, where the access node is also configured to implement a traffic allocation technique, the method comprising the steps of:
receiving a connection setup request message initiated by the access terminal, where the connection setup request message includes a request from the access terminal to use an originating frequency;
determining if the access terminal is locked from changing from the originating frequency, where the access terminal would be locked if there was a predetermined number of previous connection setups which had previously failed when the access terminal was redirected by the traffic allocation technique from a previously requested originating frequency to some other frequency; and
if the access terminal is locked, then setting a connection for the access terminal on the originating frequency regardless if the traffic allocation technique had determined the access terminal should be redirected from the originating frequency to a target frequency, where the originating frequency is different than the target frequency; otherwise
if the access terminal is not locked, then setting a connection for the access terminal to either the originating frequency or the target frequency as determined by the traffic allocation technique.

9. The method of claim 8, wherein the traffic allocation technique is implemented before determining whether or not the access terminal is locked from changing from the originating frequency.

10. The method of claim 8, wherein the traffic allocation technique is implemented after determining that the access terminal is not locked from changing from the originating frequency, and if the access terminal is locked then preventing the implementation of the traffic allocation technique.

11. The method of claim 8, wherein if the access terminal is locked then unlocking the access terminal after a predetermined number of past connection setups had been successfully completed during which the access terminal was locked.

12. The method of claim 8, wherein if the access terminal is locked then performing the following steps:
   incrementing a variable attempts_after_lock counter for the access terminal:
   determining if the variable attempts_after_lock counter for the access terminal exceeds an unlock_threshold value;
   if no, then end;
   if yes, then unlocking the access terminal such that upon receiving a future connection setup request message the access terminal can change from an originating frequency, and reset the variable attempts_after_lock counter for the access terminal to an initial value.

13. The method of claim 8, wherein if the access terminal is not locked and the connection for the access terminal was set to be on the target frequency as determined by the traffic allocation technique then performing a connection setup success verification process to determine if need to lock the access terminal.

14. The method of claim 8, wherein if the access terminal is not locked and the connection for the access terminal was set to be on the target frequency as determined by the traffic allocation technique then performing the following steps:
   determining if the connection that was set on the target frequency for the access terminal was successful;
   if yes, then incrementing a variable attempt_count counter for the access terminal and determining if the variable attempt_count counter for the access terminal exceeds an counting_interval_threshold value and if not then end and if yes then resetting the variables attempt_count and number_of_failures counters for the access terminal to an initial value and then end;
   if no, then incrementing the variable attempt_count counter for the access terminal and incrementing a variable number_of_failures counter for the access terminal and then determining if a ratio of values of the variable number_of_failures counter/the variable attempt_count counter exceeds a failed_threshold value and if no then determining if the variable attempt_count counter for the access terminal exceeds the counting_interval_threshold value and if not then end and if yes then resetting the variable attempt_count counter and the variable number_of_failures counter for the access terminal to their initial values and then end, and if the ratio of values of the variable number_of_failures counter/the variable attempt_count counter was determined to exceed the failed_threshold value then locking the access terminal and resetting the variable number_of_failures counter for the access terminal to an initial value and resetting the variable attempt_count counter for the access terminal to the initial value and then end.

15. A wireless telecommunication system comprising:
   an access node;
   one or more radio sites, wherein an access terminal is located within a radio coverage area of one of the radio sites,
   the access node is configured to implement a traffic allocation technique and is further configured to improve a success rate of a connection setup for the access terminal, the access node comprising:
      a processor; and
      a memory that stores processor-executable instructions therein where the processor interfaces with the memory and executes the processor-executable instructions to enable the following:
         receive a connection setup request message initiated by the access terminal, where the connection setup request message includes a request from the access terminal to use an originating frequency;
         determine if the access terminal is locked from changing from the originating frequency, where the access terminal would be locked if there was a predetermined number of previous connection setups which had previously failed when the access terminal was redirected by the traffic allocation technique from a previously requested originating frequency to some other frequency; and
         if the access terminal is locked, then set a connection for the access terminal on the originating frequency regardless if the traffic allocation technique had determined the access terminal should be redirected from the originating frequency to a target frequency, where the originating frequency is different than the target frequency; otherwise
         if the access terminal is not locked, then set a connection for the access terminal to either the originating frequency or the target frequency as determined by the traffic allocation technique.

16. The wireless telecommunication system of claim 15, wherein the access node implements the traffic allocation technique before determining whether or not the access terminal is locked from changing from the originating frequency.

17. The wireless telecommunication system of claim 15, wherein the access node implements the traffic allocation technique after determining that the access terminal is not locked from changing from the originating frequency, and if the access terminal is locked then the access node prevents the implementation of the traffic allocation technique.

18. The wireless telecommunication system of claim 15, wherein when the access node determines that the access terminal is locked then the access node is further configured to unlock the access terminal after a predetermined number of past connection setups had been successfully completed during which the access terminal was locked.

19. The wireless telecommunication system of claim 15, wherein if the access terminal is locked then the access node is configured to further enable the following:
   increment a variable attempts_after_lock counter for the access terminal;
   determine if the variable attempts_after_lock counter for the access terminal exceeds an unlock_threshold value;
   if no, then end;
   if yes, then unlock the access terminal such that upon receiving a future connection setup request message the access terminal can change from an originating frequency, and reset the variable attempts_after_lock counter for the access terminal to an initial value.

20. The wireless telecommunication system of claim 15, wherein when the access node determines that the access terminal is not locked and the connection for the access terminal was set to be on the target frequency as determined by the traffic allocation technique then the access node is further configured to perform a connection setup success verification process to determine if need to lock the access terminal.

21. The wireless telecommunication system of claim 15, wherein if the access terminal is not locked and the connection for the access terminal was set to be on the target frequency as determined by the traffic allocation technique then the access node is configured to further enable the following:
   determine if the connection that was set on the target frequency for the access terminal was successful;

if yes, then increment a variable attempt_count counter for the access terminal and determine if the variable attempt_count counter for the access terminal exceeds an counting_interval_threshold value and if not then end and if yes then reset the variables attempt_count and number_of_failures counters for the access terminal to an initial value and then end;

if no, then increment the variable attempt_count counter for the access terminal and increment a variable number_of_failures counter for the access terminal and then determine if a ratio of values of the variable number_of_failures counter/the variable attempt_count counter exceeds a failed_threshold value and if no then determine if the variable attempt_count counter for the access terminal exceeds the counting_interval_threshold value and if not then end and if yes then reset the variable attempt_count counter and the variable number_of_failures counter for the access terminal to their initial values and then end, and if the ratio of values of the variable number_of_failures counter/the variable attempt_count counter was determined to exceed the failed_threshold value then lock the access terminal and reset the variable number_of_failures counter for the access terminal to an initial value and reset the variable attempt_count counter for the access terminal to the initial value and then end.

22. The wireless telecommunication system of claim 15, wherein the access node is a base station controller or a radio network controller.

\* \* \* \* \*